US004001589B2

United States Statutory Invention Registration [19]

[11] Reg. Number: H1589

Rosenthal

[45] Published: Sep. 3, 1996

[54] COMBINED VIDEO AND TEXT DATA DISTRIBUTION SYSTEM

[75] Inventor: David A. Rosenthal, Ridgecrest, Calif.

[73] Assignee: The United States of America as represented by the Secretary of the Navy, Washington, D.C.

[21] Appl. No.: 238,555

[22] Filed: May 5, 1994

[51] Int. Cl.[6] ..... G01W 1/00

[52] U.S. Cl. ..... 364/420; 364/514 R; 364/514 A; 395/153; 395/154

[58] Field of Search ..... 364/514; 348/423, 348/9; 345/2; 395/153, 154, 162, 200

[56] References Cited

U.S. PATENT DOCUMENTS

| | | | |
|---|---|---|---|
| 4,337,483 | 6/1982 | Guillou | 358/114 |
| 4,811,407 | 3/1989 | Blokker, Jr. et al. | 382/1 |
| 5,235,680 | 8/1993 | Bijnagte | 395/161 |
| 5,260,788 | 11/1993 | Takano et al. | 358/142 |
| 5,394,182 | 2/1995 | Klappert et al. | 348/10 |

*Primary Examiner*—Bernarr E. Gregory

*Attorney, Agent, or Firm*—Melvin J. Sliwka

[57] ABSTRACT

A data distribution system includes a method and apparatus for distributing digitized video and text data relating to the geophysical and planetary environment in a format compatible with desk top type computers. The data distribution system comprises a data encoding means which processes and encodes the data utilizing a specialized data compression and data handling protocol coupled with a means for data transmission and a means for data expansion and decoding by the user. The processed data can then be displayed, stored, printed, deleted, imported, exported in accordance with the user's preferences.

2 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMBINED VIDEO AND TEXT DATA DISTRIBUTION SYSTEM

BACKGROUND OF THE INVENTION

The present invention relates generally to a method of data distribution and more particularly to a system that distributes digitized video and text data relating to the geophysical and planetary environment in a format compatible with desk top type computers.

Currently, an international network of data collection and dissemination facilities monitor the solar-terrestrial environment. This network reports conditions on the earth and in near-earth space which may impact satellites, communications, global navigation, and electric power communities. This network further provides space weather forecasts and issues warnings of changes in the solar-terrestrial environment that could have adverse effects to various technological systems.

The solar-terrestrial environment can be directly responsible for many hazards to technological systems on earth. The primary hazards to many technology based industries such as the electric power industry are sudden disturbances in the earth's magnetic field which induce large transient currents in power transmission lines. The adverse effects of these transient currents can range from shutdown of large grid segments to destruction of large power transformers. Warnings of geomagnetic disturbances enable protective measures to be applied to the power systems which minimize service interruptions and avoid equipment damage or equipment failures which translate to cost savings. However, existing solar-terrestrial warning systems can be delayed as much as fifteen minutes before the warning reaches the affected users. This delay is due primarily to limitations in the data communication systems currently used. To offset this delay, many power companies rely on solar-terrestrial forecasts to make decisions about implementing remediative measures. Solar-terrestrial forecasts, much like terrestrial weather forecasts, are inherently uncertain which also translates to higher operation costs for the power companies.

Typical problems experienced by orbiting satellites include bombardment and damage from high energy subatomic particles that interfere or disrupt operation of the spacecraft electronics. In addition, at satellite altitudes, streams of high energy, electrically charged particles can produce large voltage transients between electronic components in a phenomena known as "spacecraft charging". Timely detection and warning of a solar event potentially hazardous to satellite operations could extend satellite lifetimes if protective measures could be implemented before the solar caused disturbances reach the satellites.

Related art in the field of data distribution systems includes U.S. Pat. No. 5,062,136 issued Oct. 29, 1991 to Gattis et al. discloses a teleconferencing system via a digital data network which includes video cameras, desk top computers, and an encoding and compressing means similar to the present invention as well as a similar decoding and expansion means. The teleconferencing system interchanges video and text data between two desk top computers in a manner similar to the interchange of video and text data in the present data distribution system.

There are numerous disclosures addressing the combination of video and audio data for transmission over standard telephone lines. One such example is found in U.S. Pat. No. 4,849,811 where a method for simultaneous sending audio and video signals over standard telephone lines or other channels is disclosed. The disclosed method involves obtaining a video image, digitizing the image, modulating a signal with the digitized image, obtaining audio signals and filtering the audio signals to a frequency range outside that of the modulated video signal. The video and audio signals are subsequently combined and transmitted.

In addition, U.S. Pat. No. 4,916,539 issued Apr. 10, 1990 to Galumbeck discloses a communications system capable of receiving, storing, processing and sending digital and conventional video, audio and control signals for use in current local and national weather information systems.

SUMMARY OF THE INVENTION

Accordingly, it is an object of the present invention to provide a combined video and text data distribution system for the collection, compression, transmission, receipt, conversion and display of geophysical and solar-terrestrial environment data in a format compatible with desk top type computers.

It is another object of the present data distribution system to provide a centralized data distribution system for terrestrial phenomena data and solar-terrestrial data which can be delivered in near real time to users throughout the world.

Several important advantages of the present data distribution system is that it provides for video data encoding and compression. The data encoding is delta coding of the pixel brightness in the horizontal direction only, so there is no degradation of the vertical resolution occurs at any transmission rate. Delta coding is a process of transmitting a series of values by sending only the difference or delta between the previous value and the next value. The pixel code data of the video image is also compressed to a variable length sequence of binary bits utilizing a scheme known as entropy coding. This variable length entropy coding system allows a higher volume of data to be transmitted per unit of time than a fixed length coding system.

A particular feature of the present data distribution system is that it provides for the transmission of compressed video images for display as motion pictures or as still video images combined with the transmission of a large quantity of text data between pictures and picture lines.

Another feature of the present invention is that the present data distribution system allows for sub-carrier based distribution of the data via satellite which subsequently can be separated from the distribution signal and made available for use.

Still another feature of the present data distribution system is the use of a Vertical Blanking Interval (VBI) based distribution scheme. The VBI based distribution scheme packs the data into lines 10 through 18 of the VBI of the National Television Standards Committee (NTSC) video waveforms which are then uplinked to various satellites for relay throughout the world. A user in the satellite's footprint can utilize VBI decoders to extract the data and make it available for use.

Yet another feature of the present invention is that the present data distribution system allows the for the decoding and expansion of the data by the user. A specialized circuit board, or similar device is installed or otherwise attached to the individual user's desk top computer which decodes and decompresses the data. The information could then be routed to destinations determined by the user. The decoded and decompressed data are then subject to conventional data management techniques such that the data can be displayed to the user, printed, stored, copied, deleted or otherwise manipulated.

The data distribution system comprises a system that distributes digitized video and text data relating to the geophysical and planetary environment in a format compatible with desk top type computers. In broad terms, the data distribution system comprises a data encoding means which processes and encodes the data utilizing a specialized data compression and data handling protocol coupled with a means for data transmission and a means for data expansion and decoding by the user. The processed data can then be displayed, stored, printed, deleted, imported, exported in accordance with the user's preferences.

DETAILED DESCRIPTION OF THE INVENTION

The present data distribution system is particularly adapted for the collection, encoding, transmission, decoding and display of solar-terrestrial environmental images and data. This solar-terrestrial and near earth space environment data is concerned with actual and forecasted environmental conditions near the sun and in near-earth space which may impact various technological systems including scientific and military data collection systems, communication systems, and electric power distribution systems. In addition, other data sources, including but not limited to, data sources such as earthquake data from the National Earthquake Information Center, tsunami warnings from the National Oceanic and Atmospheric Administration (NOAA) Tsunami Warning Center, solar images from solar observatories around the world, satellite weather imagery data from various weather satellites, and severe weather warnings from the National Weather Service can be distributed in near real time to many users.

The aforementioned data comes from a worldwide network of sensors, spacecraft, observatories, and United States Government agencies, whose information is continuously assembled and collected. A particularly important data source is the data from the NOAA Space Environment Lab (SEL). That organization currently tracks conditions in the near- earth space environment and serves as a worldwide warning center for solar disturbances having significant impacts on spacecraft operations, communications systems, and navigation systems.

The described data distribution system provides a digital data format for transmission of these video images combined with text data via any digital channel. The transmission protocol allows for sending compressed and encoded video signals through a digital channel coupled with the reconstruction and expansion of the video signal at the receiving end. The digital transmission signal is a continuous binary digital data stream proceeding at a fixed rate. A synchronization pattern and data header is sent at the beginning of each line transmission, followed by a variable length set of variable length words.

Figure 1:
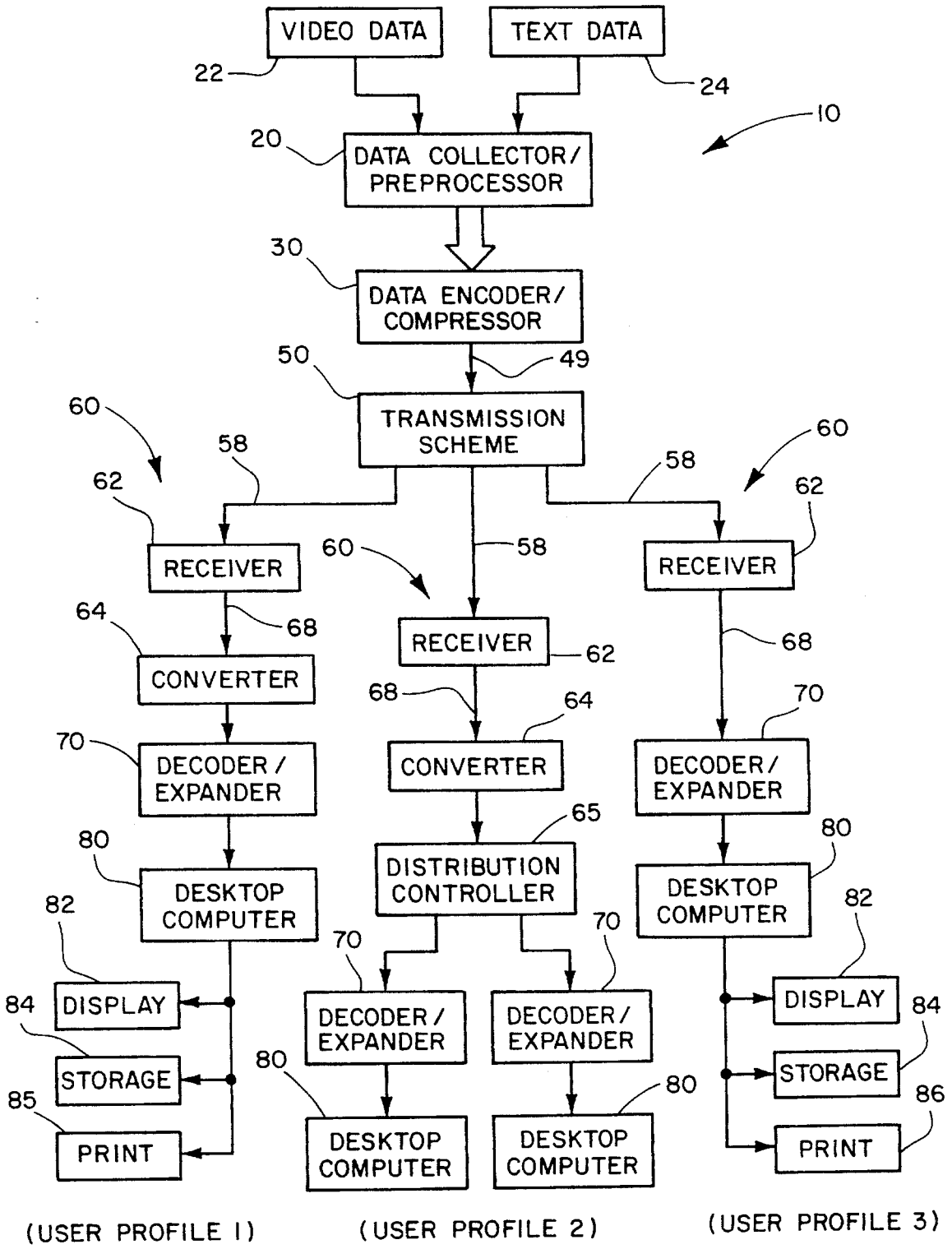
FIG. 1 is a block diagram illustrating three different user profiles of the present data distribution system for broadcasting solar-terrestrial and space environmental data to users for use with desk top type computers.

In the following paragraphs, reference is made to the drawings and particularly to FIG. 1 which illustrates the data distribution system for broadcasting solar-terrestrial and space environmental data to users for use with desk top type computers. As seen in FIG. 1, the overall data distribution system (10) comprises a centralized data collection and pre-processing means (20), a data encoding and compression means (30), a data transmission means (50), at least one data receiving means (60), at least one data decoding and expanding means (70), and at least one desk top type computer (80) including peripheral devices such as display monitors (82), file storage media (84), and printing devices (86).

The data collection and preprocessor means (20) involves the collection and assembly of solar-terrestrial and space environmental data. This data comprises both standard video images (22) as well as standard ASCII based character data (24). The data collection and pre-processor (20) segregates and identifies the input data which is then fed into the data encoding and compression means (30). This data encoding and compressing means (30) accepts the input data (22,24), processes the data further, converts the analog signals to digital data, encodes the data using a specialized delta coding algorithm and compresses the data using a specialized entropy coding sequence. The output data stream (49) from the data encoding and compressing means (30) is then fed to the means for transmission (50).

Various transmission or distribution modes are envisioned for use with the present data distribution system including standard TV broadcast, radio broadcast, telephone lines, dedicated data lines, and Vertical Blanking Interval (VBI) based distribution. The preferred data transmission mode, however, is a sub-carrier based distribution where the data stream output from the data encoder and compressor is fed to a satellite uplink facility where it is put on a sub-carrier for transmission.

An alternate transmission means is the Vertical Blanking Interval (VBI) based distribution scheme where the output from the data encoder and compressor is fed to a device which packs the outgoing data into lines 10 through 18 of the VBI of the NTSC video waveforms which are then uplinked to various satellites for relay throughout the world.

The data receiving means (60) is adapted to receive the data stream (58) distributed by the transmission means (50). The receiving means (60) typically will comprise a receiver (62) and a signal converter (64) and controller (65) to further convert the signal to a form necessary for further controlled distribution to the user. Since the preferred embodiment of the data distribution system involves transmission via a broadcast mode, the receiving means shown in FIG. 1 represents one or more actual users. In the broadcast mode, it is foreseeable to have many different users whose receiving means and subsequent distribution may differ slightly.

When the received data stream (68) or signal finally reaches the user, the signal is then fed to the data decoding and expanding means (70). In the preferred embodiment, the received data (68) are presented to a specially designed circuit board which is installed in the user's computer or peripheral device attached to the user's computer (80). The received data stream (68) is actually decoded and expanded with the aid of a decoder device which is adapted to accept a digital data signal such as that produced by the encoder described above and produces a black and white video signal output and/or a serial digital output signal. The processed data can then be displayed, stored, printed, deleted, imported, and/or exported.

The specialized encoding, compression, and transmission protocol is implemented as an adaptive system, which adjusts gray-scale and horizontal resolution on a line-by-line basis to provide the best possible picture without overloading the transmission channel. The protocol provides for delta coding in the horizontal direction only, so there is no degradation of the vertical resolution occurs at any transmission rate. Delta coding is a process of transmitting a series of values by sending only the difference or delta between the previous value and the next value. Adaptive controls are provided at the point of transmission in order to optimize gray scale, and horizontal resolution as desired, with any and all receivers automatically adjusting to decode and display the picture sent.

For the purpose of this encoding, compression and transmission protocol, a word may consist of one to twelve bits. Words are grouped together into lines which correspond to lines in the reconstructed picture or lines of binary data. Lines are grouped into pages, corresponding to picture fields. This protocol identifies and distinguishes between the video lines and the data lines.

A video line contains the start character '000000000001' followed by a ten bit identification code identifying a video line. Included in this identification code is information identifying, the picture resolution, the picture's shape, the relative position of the line, the time the picture was taken and other predetermined information. This ten bit identification code is followed by a one pad bit which is preferably a '1' followed by a '0' to indicated the end of the padding. Thus the header is 24 bits in length. The pixel code data is then sent as part of the video line. The pixel code data consists of variable length words of one to eight bits in length, typically using the shortest codes for the most likely pixel change. When the pixel data is complete, one to seven ones are sent to pad the final word boundary. The actual number of variable length pixel codes can be identified in the identification code for that particular line.

In the preferred embodiment, the identification code for a video line identifies the following information: start of picture field; pixels per line; pixel/line sampling ratios; DPCM kernels; entropy code identification; date/time; color indication; buffer capacity; buffer status, line type identification; line counter; interlaced and interleave options.

As identified above, the protocol is such that the picture's shape and resolution are transmitted as part of the picture code data, so 512×512 pixel video images can be interspersed with 1024×1024 pixel video images. This protocol also allows sending a number data lines not containing picture information between pictures and picture lines. One or more lines of data having a predetermined length are created and then loaded with data utilizing a strobe/clock device which transfers the data serially into the data line from an external buffer.

A data line contains the start character '000000000001' followed by a ten bit identification code identifying a data line. This ten bit identification code is followed by a one pad bit which is preferably a '0' which is subsequently followed by the data to be transferred. The maximum length of the data to be transferred is preferably set at 1024 bits and the minimum length is set at one bit. Included in this data is information identifying the data destination to which the data is directed when received by the user.

Figure 2:
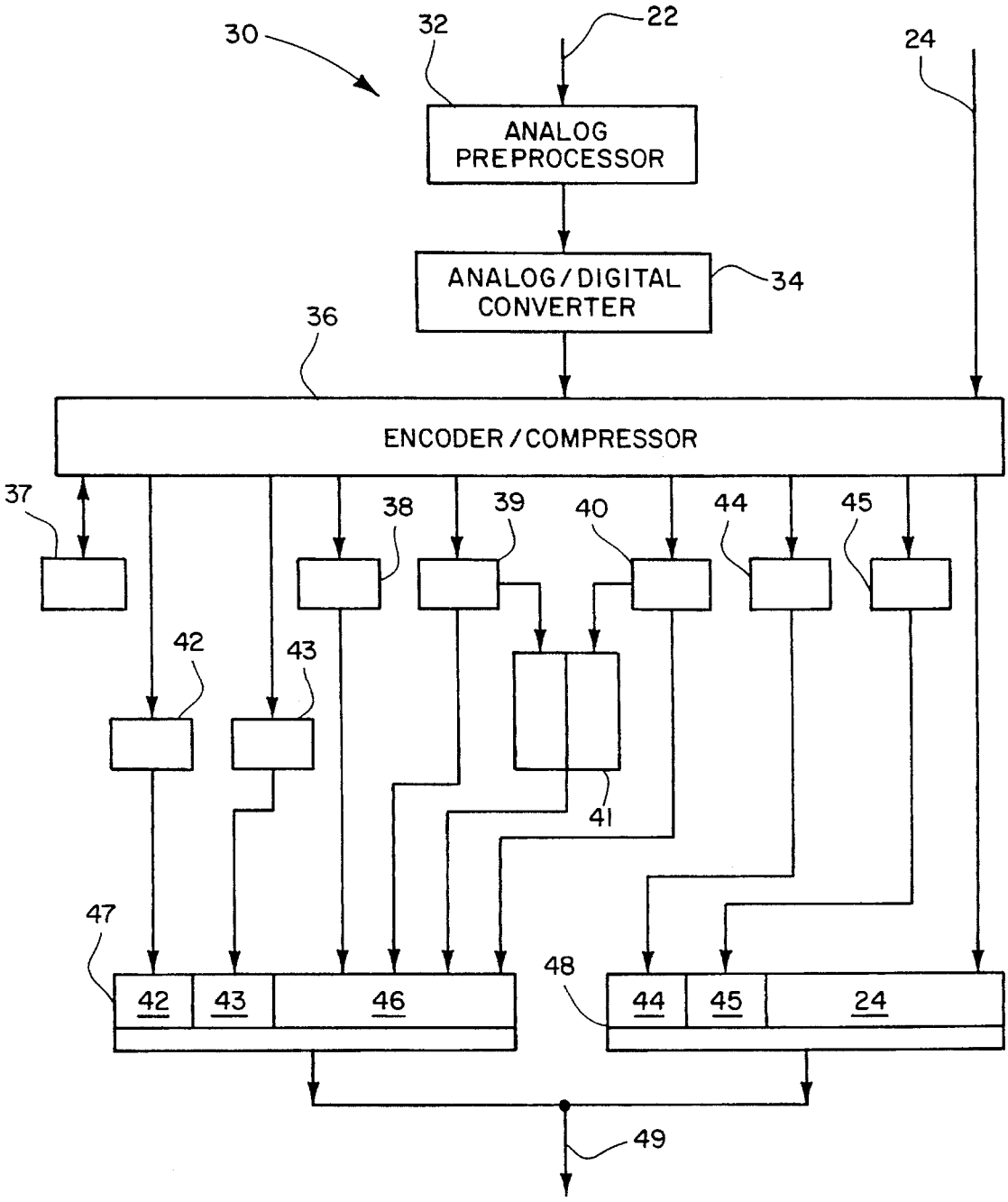
FIG. 2 is a block diagram illustrating a schematic of the encoder utilized in the present data distribution system.

FIG. 2 illustrates a schematic of the preferred encoder utilized in the present data distribution system. The preferred embodiment of the encoder (30) is adapted to accept as an input signal any standard analog video signal (22). The encoder is further adapted to accept input signals having vertical sweep rates of 59.4 fields per second to 60.6 fields per second and horizontal sweep rates of 15,562.5 to 15,938.0 lines per second. These values correspond to a ±1% variation in the vertical sweep rate of the nominal 60 Hz. Further, the encoder shall accept signals with a horizontal blanking periods of 9.0 to 11.5 microseconds duration, a horizontal pulse duration of 3.0 to 6.0 microseconds. The input signal may have vertical blanking periods of twelve through 24 lines, with vertical synchronization pulses of 3 to 6 lines.

The video signal (22) is then passed to an analog preprocessor (32) which accepts the input video signal (22) within the ranges specified above, and restores direct current and otherwise prepares the video signal (22) for analog to digital conversion.

The preferred analog preprocessor (32) also extracts an active picture window from the input video signal (22) commencing with line 22 in each field and ending with the onset of vertical blanking. The active portion of the horizontal line is preferably 51.4 to 51.8 microseconds commencing from 10.0 to 11.0 microseconds following the midpoint of the leading edge of the horizontal synchronization pulse.

The active portion of each horizontal line is further diced by the analog preprocessor (32) into evenly spaced pixels. The number of pixels that each horizontal line is typically a number such as 256, 450, 512, 640, or 900 pixels per line but may include other numbers as predetermined in the system configuration. The analog preprocessor (32) also extracts the blanking and synchronization information from the incoming video signal (22).

The individual pixels on each horizontal line are then digitized by a 7 bit analog to digital converter (34) such that its 128 bit output range covers the 0 to 100 IRE (Institute of Radio Engineers) scaled brightness range of the input pixel. The analog to digital converter (34) preferably performs the 7 bit conversion in 70 nanoseconds or less and passes the digital signal to the encoder/compressor (36).

The encoder/compressor (36) is adapted to accept the digital data stream and generate a variety of codes utilizing a predetermined algorithm. One particular code generated by the encoder is a kernel predictor (37). The kernel predictor (37) is a code which represents the previously transmitted pixel brightness value. The kernel predictor (37) is used to predict a value for the next pixel. At the beginning of a horizontal line, the kernel predictor (37) is fixed at the value of zero.

A two or three bit delta code (38,39,40) is generated by the encoder/compressor (36) for all possible ranges of the delta code value including zero. A delta code value of zero indicates that there is no brightness difference between the incoming pixel and the kernel. There are three delta pulse code modulation (DPCM) modes used by the encoder/compressor (36) in the preferred embodiment. These modes include three bit normal DPCM, three bit high-level DPCM, and a two-bit DPCM.

For the two bit DPCM mode, four different values can be expressed in the two bit delta code (38). These four values are jump values which correspond to the brightness value differential between the previous pixel and the input pixel. The jump values for the two bit DPCM delta codes (38) are identified below:

| Two-bit DPCM Delta Code | Jump Value |
|---|---|
| 1 | −26 |
| 2 | −4 |
| 3 | +26 |
| 4 | +4 |

The three bit normal DPCM delta codes (39) also expresses the change in brightness value between the previously transmitted pixel and the input pixel. The brightness values are expressed in the 128 point range between '0' which represents the blackest black, and '127' which represents the whitest white. Eight different values can be expressed in the three bit delta code (39). These eight values are jump values which correspond to the brightness value changes between the predictor and the input pixel. The jump values for the three bit normal DPCM delta codes (39) are identified below:

| Normal DPCM Delta Code | Jump Value |
|---|---|
| 1 | 0 |
| 2 | +3 |
| 3 | −3 |
| 4 | +8 |
| 5 | −8 |
| 6 | +20 |
| 7 | −20 |
| 8 | Maximum Jump |

Maximum Jump represents 40 brightness steps in the direction that the largest jump can be taken. As an example, if the previously transmitted pixel value were 32, the maximum Jump value would take the input pixel to a brightness value of 72. If the previously transmitted pixel value were 63, the maximum Jump value would take the input pixel to a brightness value of 103. However, if the previously transmitted pixel value were 64, the maximum Jump value would take the input pixel to a brightness value of 24.

The three bit high level DPCM delta codes (40) also express the change in brightness value between the previously transmitted pixel or predictor and the input pixel. The brightness values are expressed in the 128 point range between '0' and '127'. Eight different values can be expressed in the three bit delta code (40). These eight values are jump values which correspond to the brightness value changes between the predictor and the input pixel. The jump values for the three bit high level DPCM delta codes (40) are identified below:

| High Level DPCM Delta Code | Jump Value |
|---|---|
| 1 | 0 |
| 2 | +4 |
| 3 | −4 |
| 4 | +10 |
| 5 | −10 |
| 6 | +25 |
| 7 | −25 |
| 8 | Maximum Jump |

Maximum Jump represents 50 brightness steps in the direction that the largest jump can be taken. As an example, if the previously transmitted pixel value were 32, the Maximum Jump value would take the input pixel to a brightness value of 82. If the previously transmitted pixel value were 63, the maximum Jump value would take the input pixel to a brightness value of 113. However, if the previously transmitted pixel value were 64 or more, the Maximum Jump value would subtract 50 brightness steps.

The three bit delta codes (39,40) can then be further encoded by a variable length entropy coding process. Entropy coding is based on the notion that a value that is likely to occur is transmitted more quickly than a message that is less likely to occur. A variable length entropy coding system allows a higher volume of data to be transmitted per unit of time than a fixed length coding system. When entropy coding is used in the preferred encoder (30), the pixel code (46) sent to the buffer (47) for transmission is partially determined by the previous Delta Code value. The previous Delta Code value and the current Delta Code value are used together with the following table to identify the variable length entropy code (41) sent to the buffer (47) for transmission.

| | Variable Length Entropy Codes | | | | | | | |
|---|---|---|---|---|---|---|---|---|
| Previous | Current Delta Code | | | | | | | |
| Delta Code | 1 | 2 | 3 | 4 | 5 | 6 | 7 | 8 |
| 1 | 1 | 001 | 01 | 00001 | 0001 | 0000001 | 000001 | 00000001 |
| 2 | 1 | 01 | 001 | 0001 | 00001 | 000001 | 0000001 | 00000001 |
| 3 | 1 | 0001 | 01 | 00001 | 001 | 0000001 | 000001 | 00000001 |
| 4 | 001 | 01 | 00001 | 1 | 000001 | 0001 | 0000001 | 00000001 |
| 5 | 001 | 00001 | 01 | 000001 | 1 | 0000001 | 0001 | 00000001 |
| 6 | 0001 | 001 | 00001 | 01 | 000001 | 1 | 0000001 | 00000001 |
| 7 | 001 | 00001 | 0001 | 0000001 | 01 | 000001 | 1 | 00000001 |
| 8 | 1 | 001 | 01 | 00001 | 0001 | 0000001 | 000001 | 00000001 |

As described above, the pixel codes (46) can be either two bit fixed length codes (38) (two bit DPCM ), three bit fixed length codes (39,40) (three bit normal DPCM or three bit high level DPCM), or a one bit to eight bit variable length entropy code (41) (three-bit DPCM with entropy coding). The encoder (30) selects the optimum type of pixel code (46) to be transmitted which depends on the transmission capacity and other system variables. Only one type of pixel codes (46) are sent for any given transmitted line. The type of pixel coding used is identified in the identification code (43) for each line.

The start character sequence (42), the identification code (43), and the pixel codes (46) are then passed to the buffer (47) where they are collected until the line is ready to be transmitted. The buffer (47) is preferably a first-in-first-out (FIFO) shift register having a duration of at least 262,144 bits. A second buffer (48) may also be used to handle the text data (24) or other non-video data which requires transmission. For these data lines, the external second buffer (48) accepts the start character sequence (44) followed by the data identification code (45), followed by a fixed length of data characters to be transmitted. These data lines can be transmitted between pictures or picture lines.

Referring again to FIG. 1, the present data distribution system (10) is preferably used in a broadcast mode as opposed to a one way or two way communication system. As stated earlier, several transmission or distribution modes are envisioned for use with the data distribution system including standard TV broadcast, radio broadcast, telephone lines, dedicated data lines, and Vertical Blanking Interval (VBI) based distribution. The preferred distribution mode is sub-carrier based distribution. The sub-carrier based data streams consist of a 1.544 Mbit per second data stream. The data stream output (49) from the encoder (30) is fed to a satellite uplink facility where more data may be added before being put on a sub-carrier for transmission. The equipment necessary to receive the data streams consist of a satellite dish and receiver (62) capable of recovering the relayed television signal. The data streams are received via conventional Television Receive Only (TVRO) facilities. In the satellite's reception footprint, the TVRO equipment takes the sub-carrier from the television signal, converts the signal with a signal converter (64) and allows for the controlled distribution of the signal to the users. For example, the signal can be converted to a radio frequency and further broadcast or distributed to the users using a predetermined portion of a given spectrum. If so desired, individual users can access the sub-carrier directly by receiving the television signal directly and then extracting and converting the sub-carrier data stream. This received data stream (68) can then fed directly into the user's computer (80) where it is converted, decoded and expanded.

An alternate distribution system is the Vertical Blanking Interval (VBI) based distribution scheme. VBI is the time that the electron gun in a television set is turned off while the beam is repositioned back to the top left corner of the television screen. This interval is equivalent to the time necessary to sweep out 21 horizontal picture lines. The 21st horizontal line is currently used in the United States to insert 'closed captions for hearing impaired viewers. The VBI based distribution scheme is offered at a 64 kbit per second data transmission rate. The data stream output from the encoder is fed to a device which packs the outgoing data into lines 10 through 18 of the VBI of the NTSC video waveforms which are then uplinked to various satellites for relay throughout the world. User's in the satellite's footprint utilize VBI decoders to extract and use the data.

In the preferred embodiment, the received data stream (68) is presented to a specially designed circuit board which is installed in the user's computer (80) or peripheral device attached to the user's computer (80). The received data stream (68) is actually decoded and expanded with the aid of a decoder device (70). The information is then routed by the computer processors to destinations determined by the user.

The preferred decoder device (70) is adapted to accept a digital data signal such as that produced by the encoder described above and produces a black and white video signal output with 128 to 900 pixels per line and/or a serial digital output signal and strobe/clock output when the input signal contains such data. The decoder shall accept and display the picture represented by the three bit normal DPCM entropy coded data, the three bit high level DPCM entropy coded data, three bit per pixel DPCM non-entropy coded data, or the two-bit per pixel DPCM coded data as described above. The decoder is further adapted to separate video lines from data lines and route the information to the appropriate destinations for further processing.

The processed data can then be displayed, stored, printed, deleted, imported, exported in accordance with the user's preferences. Application specific software is available which allows the user to override data priorities originally assigned by the encoder, or otherwise designate certain data for use in predetermined applications.

Because the data distribution system continuously broadcasts over a wide area and users can begin monitoring the data at any time, the delivery method is preferably asynchronous and capable of transmitting an entire data package rather quickly. To accomplish this feature, the data distribution scheme utilizes a repeating data frame which contains the most current information and digitized video images. Within the frame, each piece of data has its own unique numerical identity which is called a 'tag'. Once identified by the assigned 'tag', the software begins organizing incoming tags according to user defined preferences. Information inside each tag can change at any time, thus the software is designed to detect the new data and update the frame accordingly. Each data line is further assigned a priority code.

Since information is transferred sequentially to the user's desk top computer, the software allows the higher priority data to interrupt and replace the flow of lower priority data. After the higher priority data is sent, the lower data priority data stream resumes. In the preferred embodiment, there are four levels of data prioritization, which are identified as: 1) ASCII character based alarm data (data line); 2) ASCII based character data that changes rapidly (data line); 3) Digitized video image data (video Line); and 4) ASCII based character text that changes slowly (data line).

In the preferred embodiment, the user display is set such that a predetermined video image occupies the left 80% of the computer monitor and a vertical bar with alphanumeric ASCII data fills the remaining 20% of the monitor. A separate alarm page of data contains current warnings plus related hazardous condition information, and forecasts. Subsequent pages of data include alternate video images or ASCII character based reports and forecasts as well as any previously stored historical information.

From the foregoing description, those skilled in the art will appreciate that all the objects, advantages and features of the present invention are realized. A method has been described for distributing geophysical and solar-terrestrial data which comprises the collection, encoding, compression, transmission, receipt, expansion, decoding and display of such data. This described approach to information distribution is not limited to any particular data and can be used in conjunction with a wide variety of applications such as information services, advertising, and messaging. While a specific embodiment of the data distribution system is disclosed, those persons skilled in the art will appreciate that certain modifications may be made to the disclosed system and method without departing from its spirit. Therefor it is not intended that the scope of the invention be limited to the specific embodiment described, rather it is intended that the scope of this invention be determined by the appending claims and their equivalents.

What I claim as the invention is:

1. A data distribution system for combining input video signals and text data in a format compatible with desk top type computers comprising:

a data collection means adapted for collecting and processing a plurality of input video signals and text data;

an encoding and compressing means connected to the data collections means for encoding and compressing the input video signals and encoding text data thereby producing a digital data stream output signal;

a transmission means connected to the encoding and compressing means for transmitting the digital data stream output signal;

a receiving means adapted for receiving the transmitted digital data stream output signal;

a decoding and expansion means connected to the receiving means for decoding and expanding the digital data stream output signal received by the receiving means and producing a video signal output with digital information electronically inserted during the regularly occurring intervals when no video information is present; and a desk top type computer connected to the decoding and expansion means for the management and display of the video output signal and interspersed text data produced by the decoding and expansion means.

2. The data distribution system for combining input video signals and text data of claim 1 wherein the input video signals and text data are solar-terrestrial and space environmental data.

* * * * *